(12) United States Patent
Hovad

(10) Patent No.: US 6,634,828 B1
(45) Date of Patent: Oct. 21, 2003

(54) METHOD FOR IN SITU RENOVATION OF A MANHOLE, PARTICULARLY A SEWER MANHOLE, AND PREFABRICATED LINER THEREFORE

(75) Inventor: Karl Erik Hovad, Kolding (DK)

(73) Assignee: Tunetanken A/S, Vejen (DE)

( * ) Notice: Subject to any disclaimer, the term of this patent is extended or adjusted under 35 U.S.C. 154(b) by 0 days.

(21) Appl. No.: 10/018,246
(22) PCT Filed: Jun. 16, 2000
(86) PCT No.: PCT/DK00/00322
§ 371 (c)(1), (2), (4) Date: Dec. 18, 2001
(87) PCT Pub. No.: WO00/79176
PCT Pub. Date: Dec. 28, 2000

(30) Foreign Application Priority Data

Jun. 18, 1999 (DK) .................................... 1999 00871

(51) Int. Cl.⁷ ............................ B65G 5/00; F16L 55/18
(52) U.S. Cl. ..................... 405/55; 405/52; 405/146; 405/150.1; 405/184.2; 405/303; 156/94; 156/287; 264/269; 264/516; 138/98; 138/97
(58) Field of Search ............... 405/52, 146, 150.1, 405/154.1, 155, 303; 156/156, 94, 287, 294, 330, 293, 910; 264/36.1, 269, 516, 314; 428/492, 493; 138/97, 98, 115

(56) References Cited

U.S. PATENT DOCUMENTS

| | | | | |
|---|---|---|---|---|
| 3,981,760 A | * | 9/1976 | Elmer | 156/910 X |
| 4,049,603 A | * | 9/1977 | Elmer | 428/494 X |
| 4,051,281 A | * | 9/1977 | van Gils et al. | 156/910 X |
| 4,051,296 A | * | 9/1977 | Windecker | 428/322.7 |
| 4,640,313 A | * | 2/1987 | Stanley | 138/97 X |
| 4,956,041 A | * | 9/1990 | Mihazaki et al. | 156/287 X |
| 5,106,440 A | * | 4/1992 | Tangeman | 156/156 X |
| 5,265,981 A | * | 11/1993 | McNeil | 405/303 |
| 5,490,744 A | * | 2/1996 | NcNeil | 405/303 |
| 5,736,077 A | * | 4/1998 | Kamiyama et al. | 156/294 X |
| 6,024,910 A | * | 2/2000 | Kamyama et al. | 264/516 |
| 6,368,025 B1 | * | 4/2002 | McNeil | 405/303 |
| 6,401,759 B1 | * | 6/2002 | Kamiyama et al. | 138/98 |

FOREIGN PATENT DOCUMENTS

| | | |
|---|---|---|
| DE | 196 10 510 | 9/1997 |
| DK | 173055 | 1/1989 |
| EP | 0 557 838 | 9/1993 |
| EP | 592115 | * 4/1994 |
| EP | 0 704 294 | 4/1996 |
| JP | 9-268639 | 10/1997 |
| NO | 171125 | 10/1992 |
| WO | 88/01707 | 3/1988 |
| WO | 95/16165 | 6/1995 |

* cited by examiner

Primary Examiner—Jong-Suk (James) Lee
(74) Attorney, Agent, or Firm—Antonelli, Terry, Stout & Kraus, LLP

(57) ABSTRACT

There is described a method and a liner for in situ renovation of a sewer manhole, e.g., a transition well, where inside the well there is inserted a prefabricated liner in the shape of a glass fiber reinforced stocking of thermosetting polyester or epoxy formed by winding, weaving or braiding externally of a unilaterally suspended mold with a diameter allowing the mold to be lowered through a manhole curb or cone, the rubber coating consisting of a detachable rubber bag that is fastened to a flange to be displaced externally on the mold, the polyester or epoxy liner being wound, woven or braided in such a way that the length/diameter ratio of the liner may subsequently be changed by changing the length/diameter ratio of the liner as the polyester or epoxy impregnated glass fibers are connected with the flange by the winding, weaving or braiding.

28 Claims, 1 Drawing Sheet

METHOD FOR IN SITU RENOVATION OF A MANHOLE, PARTICULARLY A SEWER MANHOLE, AND PREFABRICATED LINER THEREFORE

BACKGROUND OF THE INVENTION

1. Field of the Invention

The present invention relates to a method for in situ renovation of underground tanks or wells, especially sewer manholes, where a prefabricated liner of reinforced plastic is inserted inside the well.

2. Description of the Prior Art

It is commonly known to perform renovation in situ of underground pipelines, e.g., sewer conduits, by means of a thermosetting polyester impregnated tubular stocking, which is made to fit by a longitudinal seam according to a specific task, and which then is turned into location by a special turning technique by means of water pressure for subsequent setting by supplying hot water. Furthermore, to a lesser extent it is known to use such an in situ renovation technique for renovating vertical tubular shafts in buildings, for example, ventilation ducts or refuse chutes.

However, so far it has not been known to use a corresponding technique for more voluminous vertical shafts such as transition wells which normally consist of a conical transition from 600 mm to 1000 mm, concrete rings with internal diameter of 1000 mm at a depth of about 1 to 4 m, depending on installation and a bottom section where inlet and outlet conduits and possible influx are joined. The bottom section is furthermore usually shaped with berms for obtaining an optimum sewage water flow in the well. The transition wells are located in the sewer network at a distance of about 50 m separation, and the transition wells are used for inspection, cleaning and the like. Furthermore, transition wells are also established where several sewer conduits are joined into a main conduit, or where there is inlet to a main conduit. A relatively large part of the many existing transition wells for example in Denmark need replacement within the next 10 years at a rate of several thousand wells per year. The wells often lie in the roadway, which means that the cost of digging up and lowering into position of a new well will run up to about 50,000 DKK per well, and to this is added very great traffic inconveniences in the surroundings. It is expected that the problem has the same magnitude in other countries.

SUMMARY OF THE INVENTION

The invention provides a method of the kind mentioned in the description of the prior art for in site renovation of transition wells, and which can result in a considerable economic saving and a considerable reduction of the negative implications of renovation.

The method according to the invention uses a liner in the form of a glass fiber reinforced stocking of thermosetting polyester or epoxy formed on a rubber coated mold by winding, weaving or braiding, the liner being designed in such a way that the length/diameter ratio of the liner subsequently may be changed by changing the angle of inclination of the glass fibers relative to the longitudinal axis of the liner, that is, adjusting the cross-section of the liner and simultaneous by adjusting the length of the liner.

By the above method it is possible to perform in situ renovation of underground manholes, for example, transition wells, with simple measures and without the negative traffic implications. According to the invention, the renovation may furthermore be performed relatively quickly and without real digging work which is considerably cheaper than a prior art renovation with replacement of a defective manhole. In terms of personnel, a considerable savings as a team of two or three persons may be counted on to renovate several manholes per working day, thus furthermore avoiding a long-term disruption of the sewer conduit.

Furthermore, a very optimal utilization of the composite materials of the liner, glass fibers and thermosetting plastic (polyester or epoxy), is achieved where the single glass fibers are bonded together in such a way that by a wall thickness of 6–8 mm there is achieved a compression strength corresponding to the compression strength of a known plastic impregnated felt stocking with a wall thickness of about 20 mm.

Suitably, the method according to the invention may be thus modified, so that there is used a liner in the shape of a glass fiber reinforced stocking of thermosetting polyester or epoxy formed by winding, weaving or braiding externally of a unilaterally suspended, rubber coated mold with a diameter allowing the mold to be lowered through a sewer manhole curb or cone, i.e., with a diameter of the magnitude of 500–900 mm, the rubber coating consisting of a detachable rubber bag that may be expanded by a factor of about 3, and which is preferably fastened to a flange that may be displaced externally of the mold, the polyester or epoxy liner being wound at an angle of about 15–20° relative to the longitudinal direction of the mold in such a way that the length/diameter ratio of the liner may subsequently be changed by changing the angle of inclination of the glass fibers up to about 120° relative to the longitudinal direction as the polyester or epoxy impregnated glass fibers are connected with the flange by the winding, weaving or braiding. The prefabricated liner may optionally finally be covered by winding with, e.g., polyethylene film for possible cool storage until mounting in the well.

Preferably, the renovation of a manhole by the method according to the invention takes place in such a way that the mold with the closed end of the stocking shaped, glass fiber reinforced polyester or epoxy liner is lowered into the manhole, pressure is supplied between rubber bag and mold, preferably by filling with water so that the liner expands and assumes the shape of the internal surface of the manhole simultaneously with the external flange being allowed to be displaced downward so that the angle of inclination of the glass fiber winding is allowed to increase at the expansion of the liner, and, when the liner has conformed to the internal surface of the manhole, hot water is supplied between mold and rubber bag so that the polyester or epoxy liner sets. Surprisingly, it has been discovered that the polyester or epoxy liner expands rather easily in response to the water pressure and conforms to possible unevenness at the inner side of the well, so that by the subsequent setting of the liner a smooth new, easy-to-clean surface is formed which furthermore may resist attack from chemicals occurring in sewage water.

If considered necessary, the method according to the invention may be further modified by the winding with polyester or epoxy impregnated glass fiber being combined with cutter glass of a length about 25 mm, and optionally include upifila mat.

In addition, the invention is a prefabricated liner for in situ renovation of wells, especially transition wells, the liner comprising polyester or epoxy impregnated glass fibers, the liner being formed with a wall thickness of 5–10 mm, preferably about 7–8 mm, by winding on a mainly horizontal, unilaterally and rotatably suspended, tubular mold with a diameter of about 500 mm, a length of about 6000 mm and a domed bottom with a center support opposite to the rotary suspension, the tubular mold being covered by a detachable rubber bag prior to the winding, where the bag may expand by a factor of about 3 and is fastened to a flange situated close to the rotary suspension and which may be displaced externally of the tubular mold, and which is connected with the glass fibers.

In order to achieve a smooth inner side wall of the liner, the rubber bag is surrounded by a polyethylene film prior to the winding with polyester or epoxy impregnated glass fibers.

With the purpose of further reinforcing the liner according to the invention, the winding with polyester or epoxy impregnated glass fibers may be combined with cutter glass of a length about 25 mm, and optionally include unifila mat.

BRIEF DESCRIPTION OF THE DRAWINGS

The invention is explained in more detail in the following with reference to the drawing, in which.

DESCRIPTION OF THE PREFERRED EMBODIMENTS

Figure 1:
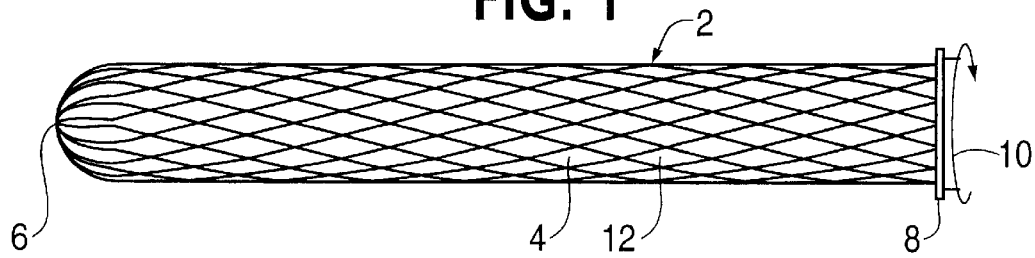
FIG. 1 shows a side view of a prefabricated liner consisting of polyester or epoxy impregnated glass fibers wound upon a horizontal tubular mold with a domed bottom opposite to a displaceable flange which is disposed close to a rotary suspension for the tubular mold.

The liner 2 shown in FIG. 1 is wound, woven or braided on a tubular mold 4 arranged rotatably about a mainly horizontal axis and with a curved, closed end part 6 and a flange 8 suspended displaceable externally of the mold 4, where individual polyester or epoxy impregnated glass fibers are connected to the flange 8 as the glass fibers, made by the winding, weaving or braiding performed from the side in a way known per se, while the mold (as indicated with arrow 10), is rotated with the fibers being passed radially around projecting turning pins fastened in or connected with the flange 8.

The mold 4, having a diameter of about 500 mm and a length of about 6000 mm, has a rubber coating applied preferably in the form of a detachable rubber bag 12 which is expandable by a factor of about 3. For protecting the rubber bag 12, a cheap polyethylene film is wound thereon which simultaneously gives the mold surface a relatively smooth outer side. Then the liner 2 is formed by winding, weaving or braiding polyester or epoxy impregnated glass fibers externally of the rubber coated mold 4 until the wall thickness of the liner reaches 5–10 mm and preferably about 8 mm. Finally, the prefabricated liner 2 is covered by polyethylene film for cool storage of the liner 2 until mounting when the polyester or epoxy is thermoset.

Figure 2:
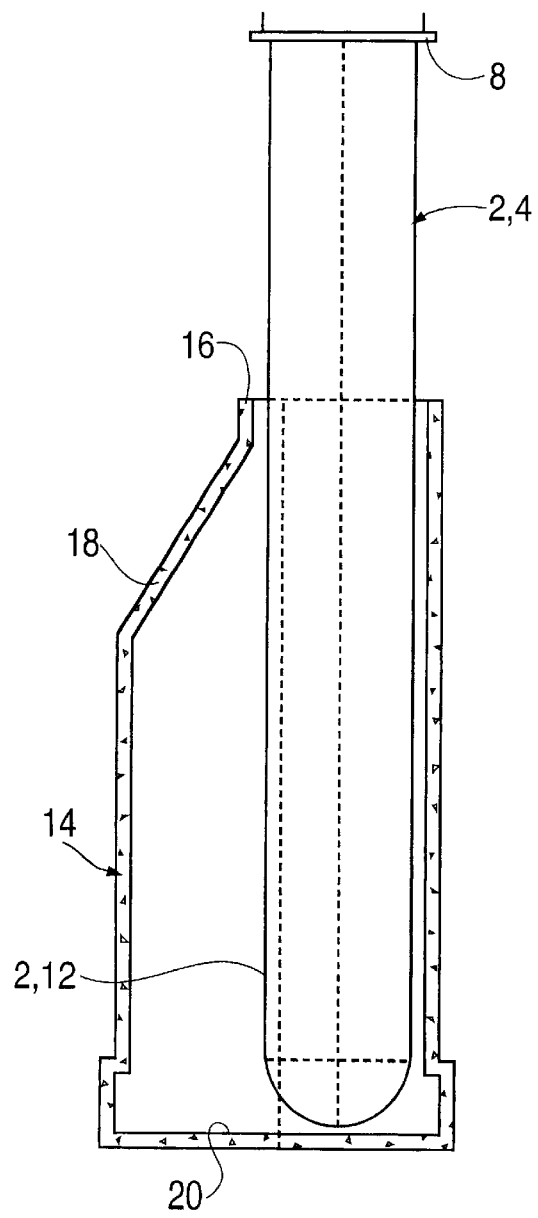
FIG. 2 shows a prefabricated liner according to the invention on a tubular mold which is lowered through a well curb, a tube cone and a transition well with a bottom berm, and outer side of the mold 4 and the inner side of the rubber bag 12, whereby the rubber bag 12 and the liner 2 are expanded under simultaneous reduction of the length of the liner 2 until the liner is pressed against the inner side of the transition well 14.
Figure 3:
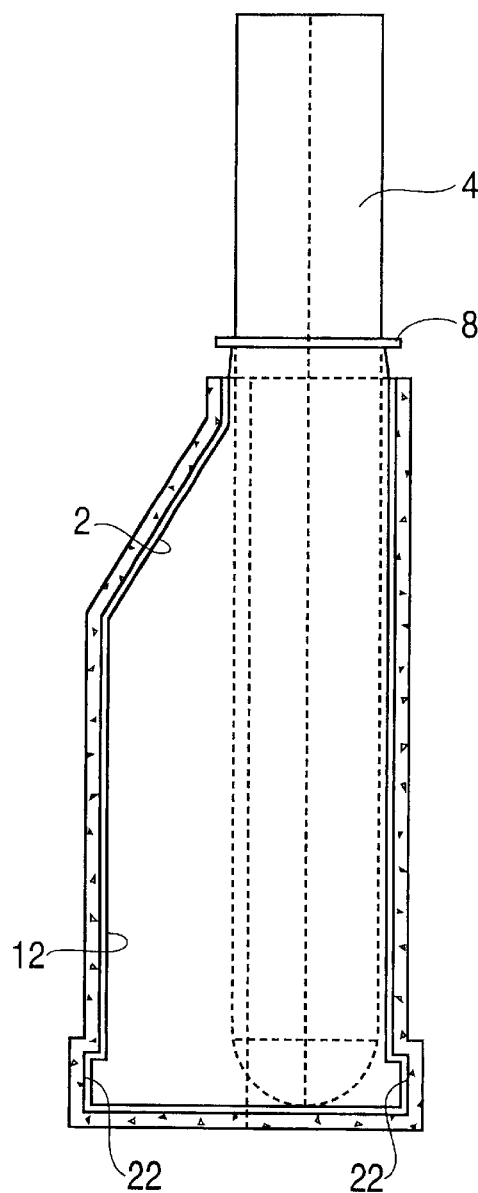
FIG. 3 shows how the cross-section of the liner is expanded by supplying a pressure medium which for example may be water, between the outer side of the tubular mold and the rubber bag so that the liner conforms to the inner side of the well as the flange, which is suspended and is displaceable externally of the tubular mold and flange in which the liner is suspended by means of polyester or epoxy impregnated glass fibers, are simultaneously displaced downwards.

Mounting of the liner 2, for example, in a transition well 14 (FIG. 2) to be renovated, occurs in the following way. The transition well is cleaned before hand and that inlets and outlets are shut off with balloons so that the well is as dry as possible. By means of crane equipment and scaffolding, the mold 4 with the liner 2 is lowered through the manhole curb 16 and well cone 18 until the closed, curved end part 6 is disposed immediately over the bottom 20 of the transition well 12. Hereafter a pressure medium, preferably cold or temperate water, is supplied between the outer side of the mold 4 and the inner side of the rubber bag 12. The water causes the rubber bag 12 and the liner 2 expand which a simultaneous reduction of the length of the liner 2 occurs until the liner presses against the inner side of the transition well 14 as illustrated.

When the liner 2 has assumed the same shape as the contour of the inner side of the transition well 14, including possible bottom berms with connecting pipe stubs 22, the expansion water is replaced with hot water so that the liner 2, consisting of glass fibers impregnated with a thermosetting polyester or epoxy, sets. After setting, the mold 4 and the rubber bag 12 are lifted up from the well, there inlets and outlets are cut free and the well may be put into service when possible balloon blockings are re moved. In this regard, it is very important that during the renovation work according to the invention itself, no people have to work in the well.

As mentioned, the liner 2 is formed, for example, by winding, weaving or braiding the mold 4 with polyester or epoxy impregnated glass fibers until there is achieved a uniform wall thickness of about 8 mm. The winding, weaving or braiding is performed with angles of inclination of the magnitude 15–20° relative to the longitudinal direction of the mold/liner, that is, relative to horizontal. By the subsequent expansion, a change of the angles of inclination between the glass fibers occurs, up to about 120° relative to vertical direction (liner and mold are raised to standing position). During this angular displacement the polyester or epoxy material remains in place, that is, one is working with a constant, known glass fiber position and constant wall thickness in prefabricated liner as well as in the finished and finally expanded liner 2.

The prefabricated liner 2 is easily removed from the mold 4 after the winding, weaving or braiding. Tt does not matter that the liner collapses during storage because there is relatively good control of the position of the polyester or epoxy material. Optionally the mold 4 may also be substituted by a relatively thin-walled and cheap tube which before winding, weaving or braiding has been inserted around the mandrel shaped mold, that is, between the mold and the rubber bag. A further alternative is to use a special rubber bag with a desired basic rigidity which prevents total collapse of the liner, but which allows necessary expansion of the rubber bag.

Finally, it should be mentioned that in order for the flange 8 to be displaced externally of the mold 4 because the individual glass fibers are connected with the flange 8 a local annular setting of the liner 2 may be used, for example, immediately before the flange 8. Such a local annular setting may easily be established by means of electric heating wires that are only wrapped around the liner locally.

Under special circumstances, for example for renovation of very deep manholes, it may be suitable, out of consideration for the transport of the mold, to make the liner at the factory with extra large diameter on an extra wide mold tube or on an optional inflated rubber bag, that is, with diameter much greater than the access opening (well curb opening). On the job site the liner may be lifted up by a crane to vertical position, the diameter of the liner may be reduced by letting air out of the rubber bag and optionally exchanging the mold tube with a thinner mold tube to a size allowing the linear to be lowered through the well cover opening, after which the diameter of the liner is increased again, as described hereinabove, by filling water into the rubber bag so that the liner is pressed outward to conform to the inner wall of the well.

In be mentioned that it is within the scope of the invention to use the described method for internal reinforcing of other items. For example, a conical stocking reinforcement with varying wall thickness could be used for positioning and expansion inside a wind mill wing in order to impart necessary strength and optimum force transmission conditions thereof.

What is claimed is:

1. A method for in situ renovation of underground tanks or manholes, where a prefabricated liner of reinforced plastic is placed at an inner wall of a cavity, comprising using a liner in the form of a glass fiber reinforced stocking of thermosetting polyester or epoxy formed on a rubber coated mold to place the liner in the tanks or manholes, the liner including a length to diameter ratio which is changed by changing an angle of inclination of the glass fibers relative to a longitudinal axis of the liner so as to adjust a cross-section of the liner and simultaneously adjust a length of the liner.

2. A method according to claim 1 for in situ renovation, wherein the liner is formed by winding, weaving or braiding externally a unilaterally suspended, rubber coated mold with a diameter allowing the mold to be lowered in situ with a rubber coating comprising a detachable expandable rubber bag which is fastened to a flange, the liner being wound at an angle of about 15–20° relative to the longitudinal direction of the mold so that the length to diameter ratio of the liner may subsequently be changed by changing an angle of inclination of the glass fibers up to about 120° relative to a longitudinal direction as the glass fibers are connected with the flange.

3. A method according to claim 2, wherein the mold has a closed end in a shape of a stocking and pressure is supplied between the rubber bag the mold, to expand the liner so that the liner assumes a shape of an internal surface of the in situ renovation with the flange being displaced downward so that an angle of inclination of the glass fibers increases with expansion of the liner, and when the liner has conformed to the internal surface of the in situ renovation, hot water is supplied between the mold and rubber bag to set the liner.

4. A method in accordance with claim 3, wherein:
the liner is formed by one of winding, weaving or braiding.

5. A method in accordance with claim 4, wherein:
a wall thickness of the liner ranges between 5 and 10 mm.

6. A method in accordance with claim 3, wherein:
a wall thickness of the liner ranges between 5 and 10 mm.

7. A method in accordance with claim 2, wherein:
the liner is formed by one of winding, weaving or braiding.

8. A method in accordance with claim 7, wherein:
a wall thickness of the liner ranges between 5 and 10 mm.

9. A method in accordance with claim 2, wherein:
a diameter of the liner ranges between 500–900 mm.

10. A method in accordance with claim 2, wherein:
a wall thickness of the liner ranges between 5 and 10 mm.

11. A method according to claim 1, wherein winding of the liner with polyester or epoxy impregnated glass fiber is combined with cutter glass.

12. A method in accordance with claim 11, wherein:
the liner is formed by one of winding, weaving or braiding.

13. A method in accordance with claim 12, wherein:
a wall thickness of the liner ranges between 5 and 10 mm.

14. A method in accordance with claim 11, wherein:
a wall thickness of the liner ranges between 5 and 10 mm.

15. A method in accordance with claim 1, wherein:
the liner is formed by one of winding, weaving or braiding.

16. A method in accordance with claim 15, wherein:
a wall thickness of the liner ranges between 5 and 10 mm.

17. A method in accordance with claim 1, wherein:
a wall thickness of the liner ranges between 5 and 10 mm.

18. A method in accordance with claim 1, wherein:
a wall thickness of the liner ranges between 5 and 10 mm.

19. A method in accordance with claim 18, wherein:
the wall thickness ranges between 7 and 8 mm.

20. A prefabricated liner for in situ renovation of underground cavities or manholes, comprising a liner of polyester or epoxy impregnated glass fibers with a wall thickness between 5 and 10 mm, a length and a doomed bottom formed on a tubular mold covered by a detachable rubber bag with the bag being expandable to place the liner in the underground cavities or manholes and is fastened to a flange which may be displaced externally of the tubular mold, and which is connected to the glass fibers.

21. A prefabricated liner according to claim 20, wherein the rubber bag is surrounded by a polyethylene film.

22. A prefabricated liner in accordance with claim 21, wherein:
the liner is formed by one of winding, weaving or braiding.

23. A prefabricated liner in accordance with claim 21, wherein:
a wall thickness of the liner ranges between 7 and 8 mm.

24. A prefabricated liner according to claim 20, wherein the glass fibers are combined with cutter glass.

25. A prefabricated liner in accordance with claim 24, wherein:
the liner is formed by one of winding, weaving or braiding.

26. A prefabricated liner in accordance with claim 24, wherein:
a wall thickness of the liner ranges between 7 and 8 mm.

27. A prefabricated liner in accordance with claim 20, wherein:
the liner is formed by one of winding, weaving or braiding.

28. A prefabricated liner in accordance with claim 20, wherein:
a wall thickness of the liner ranges between 7 and 8 mm.

* * * * *